United States Patent
Lurie et al.

(10) Patent No.: US 9,846,713 B2
(45) Date of Patent: *Dec. 19, 2017

(54) INDEX-ONLY MULTI-INDEX ACCESS

(71) Applicant: International Business Machines Corporation, Armonk, NY (US)

(72) Inventors: Andrei F. Lurie, San Jose, CA (US); Terence P. Purcell, Springfield, IL (US); Ying Zeng, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,653

(22) Filed: Jul. 5, 2016

(65) Prior Publication Data

US 2016/0314171 A1     Oct. 27, 2016

Related U.S. Application Data

(63) Continuation of application No. 14/696,377, filed on Apr. 25, 2015.

(51) Int. Cl.
  *G06F 17/00* (2006.01)
  *G06F 17/30* (2006.01)

(52) U.S. Cl.
  CPC .. *G06F 17/30315* (2013.01); *G06F 17/30474* (2013.01); *G06F 17/30477* (2013.01)

(58) Field of Classification Search
  CPC ............. G06F 7/30315; G06F 7/30474; G06F 7/30477
  USPC ......................................................... 707/715
  See application file for complete search history.

(56) References Cited

U.S. PATENT DOCUMENTS

| | | | | |
|---|---|---|---|---|
| 5,495,608 A | * | 2/1996 | Antoshenkov | .... G06F 17/30474 |
| 5,732,258 A | * | 3/1998 | Jakobsson | ......... G06F 17/30451 |
| 5,761,653 A | * | 6/1998 | Schiefer | ............ G06F 17/30463 707/713 |

(Continued)

OTHER PUBLICATIONS

Kabra et al. "Efficient Mid-Query Re-Optimzation of Sub-Optimal Query Execution Plans" published 1998 ACM, pp. 106-117, 12 pages.*

(Continued)

*Primary Examiner* — Kris Mackes
*Assistant Examiner* — Tiffany Bui
(74) *Attorney, Agent, or Firm* — North Shore Patents, P.C.; Michele Liu Baillie

(57) ABSTRACT

In an index-only multi-index access in a database, when a query to be executed requires multiple indexes, a query optimizer determines whether columns are needed for a query result, subquery, or inner join result. If not, then the query result is resolved using qualified record identifiers (RIDs) from the multiple indexes without accessing the data pages. When the columns are needed and can be resolved using input values of the query, then the query result is resolved using the qualified RIDs from the multiple indexes and substituting column values with the input values of the query. When the columns are needed and cannot be resolved using the input values of the query, the query optimizer may store one or more index keys with its corresponding qualified RIDs from the multiple indexes and may resolve the query result using the stored index keys without accessing the data pages of the database.

5 Claims, 4 Drawing Sheets

(56) References Cited

U.S. PATENT DOCUMENTS

| | | | | |
|---|---|---|---|---|
| 5,778,353 | A * | 7/1998 | Schiefer | G06F 17/30321 |
| 5,924,088 | A * | 7/1999 | Jakobsson | G06F 17/30327 |
| | | | | 707/716 |
| 6,341,277 | B1 * | 1/2002 | Coden | G06F 17/30451 |
| | | | | 707/718 |
| 7,836,036 | B2 | 11/2010 | Bhattacharjee et al. | |
| 7,895,185 | B2 | 2/2011 | Chen et al. | |
| 8,200,645 | B2 | 6/2012 | Bhattacharjee et al. | |
| 2004/0103082 | A1 * | 5/2004 | Tran | G06F 17/30439 |
| 2006/0041544 | A1 * | 2/2006 | Santosuosso | G06F 17/30424 |
| 2006/0074874 | A1 * | 4/2006 | Day | G06F 17/30463 |
| 2008/0082489 | A1 * | 4/2008 | Chen | G06F 17/30492 |
| 2009/0292714 | A1 * | 11/2009 | Han | G06F 17/30958 |
| 2010/0185639 | A1 * | 7/2010 | Day | G06F 17/30477 |
| | | | | 707/758 |
| 2011/0213775 | A1 * | 9/2011 | Franke | G06F 17/30584 |
| | | | | 707/737 |
| 2011/0295838 | A1 * | 12/2011 | Collins | G06F 17/30463 |
| | | | | 707/715 |
| 2013/0111473 | A1 | 5/2013 | Ammons et al. | |

OTHER PUBLICATIONS

"A Multi-Index, Data-Associative, Scalable Trace Access Method for Application Trace Analysis", IP.com No. 151877, Apr. 2007.
Lee, YH, et al, "Adaptive Access Plan for Select Queries With Multiple Predicates", IP.com No. 99329, Jan. 1990.
List of IBM Patents or Patent Applications Treated as Related dated Jul. 26, 2016 (2 pages).

* cited by examiner

EXAMPLE 1:
SELECT COUNT(*) FROM T2
WHERE C1=? OR C2=?

EXAMPLE 2:
SELECT COUNT(*) FROM T2
WHERE C1=? AND C2=?

EXAMPLE 3:
SELECT 1 FROM T2
WHERE C1=? OR C2=?

EXAMPLE 4:
SELECT C1, C2 FROM T2
WHERE C1 = :HV1
AND C2 = :HV2

EXAMPLE 5:
SELECT * FROM T1
WHERE EXISTS
(SELECT 1 FROM T2
WHERE T2.C1 = T1.CI
OR T2.C2 – T1.C2)

EXAMPLE 6:
SELECT * FROM T1
WHERE EXISTS
(SELECT 1 FROM T2
WHERE T2.C1 = T1.C1
AND T2.C2 = T1.C2)

EXAMPLE 7:
SELECT T1.* FROM T1, T2
WHERE T2.C1 = T1.C1
OR T2.C2 = T1.C2

EXAMPLE 8:
SELECT DISTINCT T1.*
FROM T1, T2
WHERE T2.C1 = T1.C1
OR T2.C2 = T1.C2

EXAMPLE 9:
SELECT C1, C2 FROM T2
WHERE C1 > ? AND C2 < ?

EXAMPLE 10:
SELECT C1, C2 FROM T2
WHERE C1 = ? OR C2 = ?

FIG. 6

INDEX-ONLY MULTI-INDEX ACCESS

BACKGROUND

Indexes created in relational database management systems (RDBMS) can be exploited by a query optimizer to access the index and reduce the number of data rows and pages processed. When all columns required by a query are contained within a single index, then the query optimizer can choose to access only that index and avoid accessing the data pages, commonly referred to as "index-only access". When the required columns are not within a single index, but exist within multiple indexes, then the query optimizer may consider accessing these multiple indexes. In its cost formula, the query optimizer determines and accumulates the cost of each index scan, the record identifier (RID) sort and merge, and resultant data page access, and the accumulated cost is compared with those of other access path alternatives.

When multi-index access is processed, the query optimizer obtains the qualifying record identifiers (RIDs) from each index. The RIDs function as addresses, pointing to the location of its associated row in the underlying table or data page. The list of qualifying RIDs from each index are sorted or hashed and either intersected (if the predicates are Boolean terms) or unioned (if predicates are non-Boolean terms). For efficient multi-index processing, the original index key columns are discarded at this step and only the RIDs survive for merging the lists of qualifying RIDs. However, to retrieve the index columns again after the RID merge, the RDBMS accesses the data pages using the RIDs on the merged list, since the original index key columns have been discarded. When necessary columns are spread over multiple indexes, requiring the data rows to be accessed to resolve the query result can add overhead to the query processing.

SUMMARY

According to one embodiment of the present invention, in an index-only multi-index access in a relational database management system, when a query to be executed against a database requires multiple indexes, a query optimizer determines whether one or more columns is needed for a query result, a subquery, or an inner join result. If not, then the query result is resolved using one or more qualified record identifiers (RIDs) from the multiple indexes without accessing data pages of the database. In one aspect of the present invention, in resolving of the query result, the query optimizer obtains a list of qualified RIDs from each of the multiple indexes, intersects or unions the list of the qualified RIDs from each of the multiple indexes to create a merged RID list, and determines the query result using the merged RID list without accessing the data pages of the database.

In one aspect of the present invention, in determining that the one or more columns is needed for the query result, the query optimizer determines whether the one or more columns can be resolved using one or more input values of the query. If so, then the query result is resolved using the one or more qualified RIDs from the multiple indexes and the input values of the query without accessing the data pages of the database. In one aspect of the present invention, the query result is determined using the merged RID list and substituting column values with the input values of the query.

In one aspect of the present invention, in resolving the query result and in determining that the one or more columns is not the variable length column, the query result is resolved using the one or more qualified RIDs from the multiple indexes and the input values of the query without accessing the data pages of the database. In determining that the one or more columns is the variable length column, a conditional data page access is included during a query execution. In one aspect of the present invention, the query execution includes: reading a key for a data row; determining whether the key contains trailing blanks; in determining that the key contains one or more trailing blanks, resolving the query result by accessing the data pages of the database; and in determining that the key does not contain any trailing blanks, resolving the query result using the one or more qualified RIDs from the multiple indexes and the input values of the query without accessing the data pages of the database.

In one aspect of the present invention, in determining that the one or more columns cannot be resolved using the one or more input values of the query, the query optimizer stores one or more index keys corresponding to the one or more qualified RIDs from the multiple indexes with the one or more qualified RIDs, and resolves the query result using the one or more index keys stored with the one or more qualified RIDs without accessing the data pages of the database. In one aspect of the present invention, in resolving of the query result, the query optimizer appends the one or more index keys corresponding to the qualified RIDs to the lists of qualified RIDs, intersects or unions the list of the qualified RIDs from the multiple indexes to create a merged RID list, and determines the query result using the one or more index keys stored with the qualified RIDs in the merged RID list.

System and computer program products corresponding to the above-summarized methods are also described and claimed herein.

BRIEF DESCRIPTION OF THE DRAWINGS

FIG. 6 sets forth non-limiting examples illustrating the various embodiments of the present invention.

DETAILED DESCRIPTION

Figure 1:
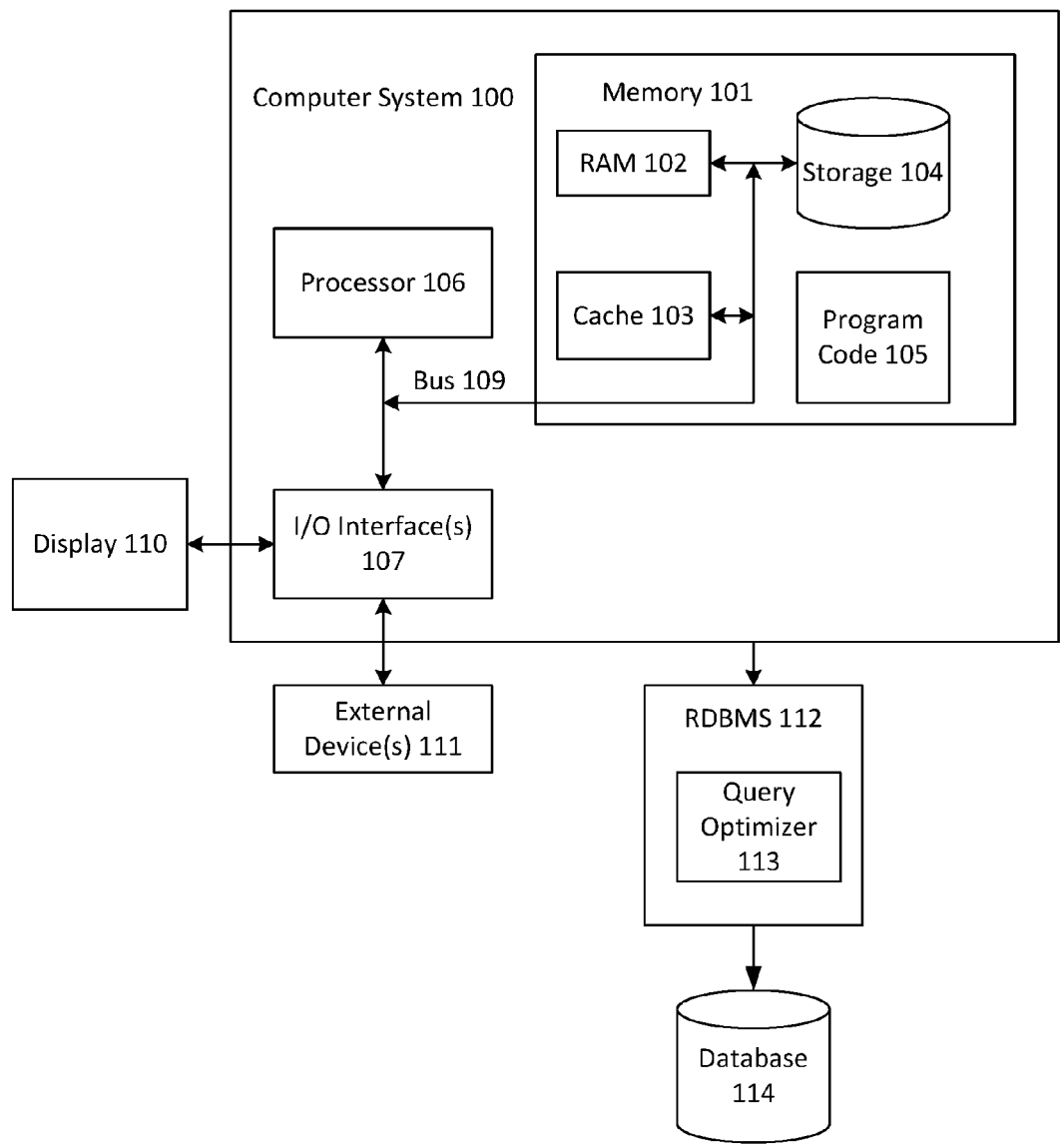
FIG. 1 illustrates a system for index-only multi-index access according to embodiments of the present invention.

FIG. 1 illustrates a system for index-only multi-index access according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory

101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. One or more of the computer systems 100 may implement a relational database management system (RDBMS) 112. The RDBMS 112 includes a query optimizer 113, which determines the most efficient way to execute a given query against tables in a database 114 by considering possible query execution access paths. The database 114 contains a plurality of tables containing the underlying data. Each row of the tables is assigned a unique row identifier (RID), which functions as the address of its corresponding row. A plurality of indexes is used to increase the efficiency of data retrieval operations on a table. Each row of an index contains at least a key column and the RID of a row in the table. The detailed structure of an index depends upon its design, the creation of which is outside the scope of the present invention.

Figure 2:
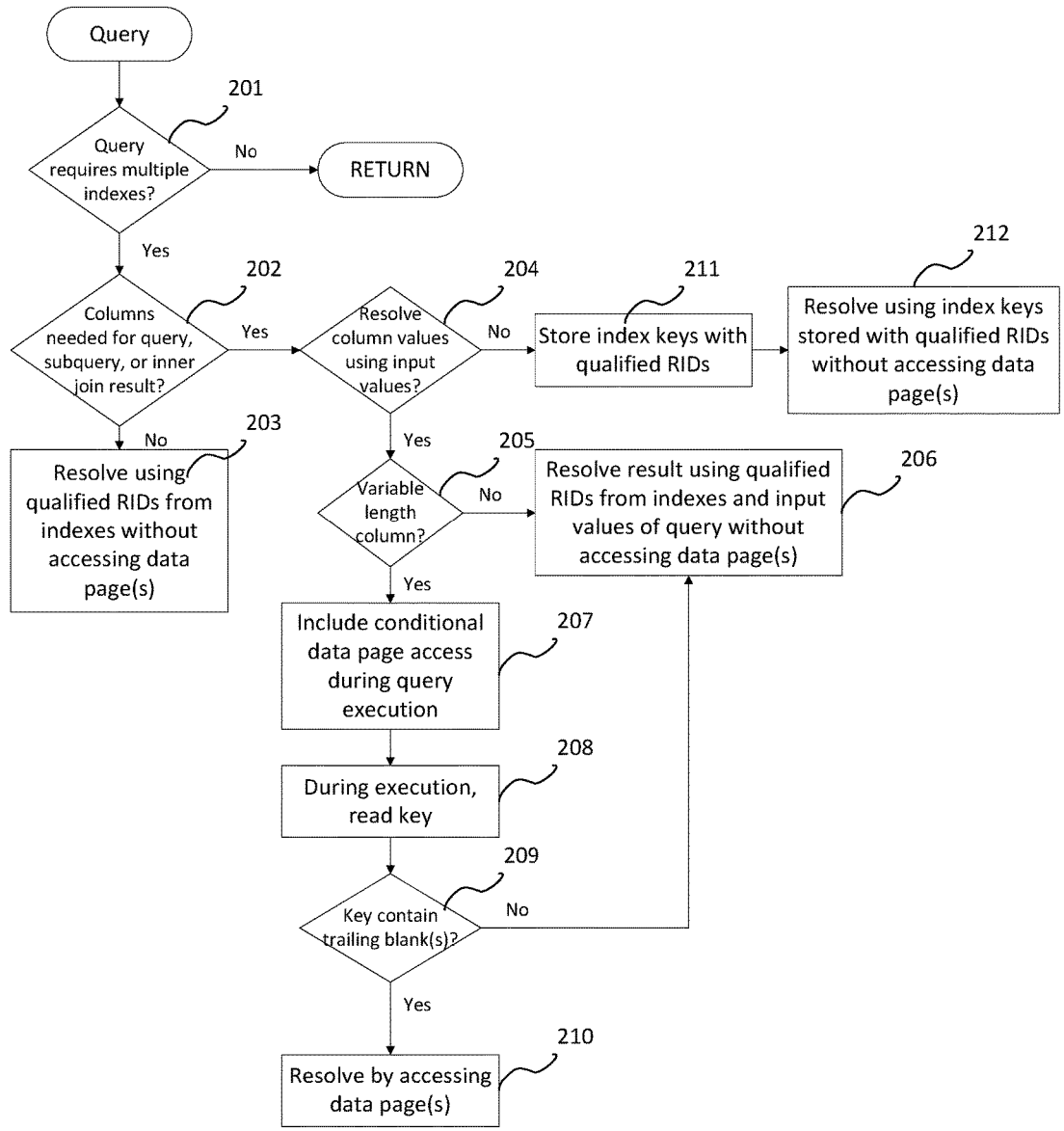
FIG. 2 illustrates a method for index-only multi-index access according to embodiments of the present invention.
Figure 3:
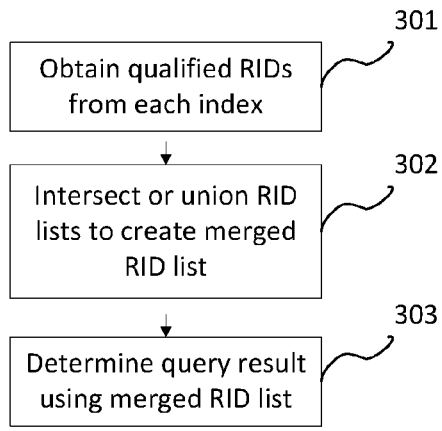
FIG. 3 illustrates a method for resolving a query result using qualified record identifiers (RIDs) from indexes without accessing the data page(s) according to embodiments of the present invention.

FIG. 2 illustrates a method for index-only multi-index access according to embodiments of the present invention. When a query to be executed against a database 114 is received, the query is parsed and then passed to the query optimizer 113. The query optimizer 113 determines whether the query requires multiple indexes (201). If so, then the query optimizer 113 determines whether one or more columns from the indexes or the data page(s) are needed for the query, subquery, or inner join result (202). If not, then the result is resolved using the qualified RIDs from the indexes without accessing the data page(s) (203). As illustrated in FIG. 3, in resolving a query result, the query optimizer 113 obtains the qualified RIDs from each index (301). The list of RIDs from each index are then either intersected or unioned to create a merged RID list. Any suitable method for creating the merged RID list, such as sorting and hashing. The RDBMS 112 then determines the query result using the merged RID list without accessing the data page(s) (303).

Consider the query in Example 1, illustrated in FIG. 6. Referring also to FIG. 2, assume that two indexes exist: INDEX1 on column C1; and INDEX2 on column C2. The query thus requires multiple indexes (201). Since the query in Example 1 only requires a COUNT(*) of the number of rows qualifying from either predicate 'C1=?' or 'C2=?', no columns are needed for the query result (202). The query optimizer 113 can resolve the query result using the qualified RIDs from INDEX 1 and INDEX 2, without accessing the data pages (203). Now referring also to FIG. 3, in resolving the query result, the query optimizer 113 accesses INDEX1 to qualify the predicate 'C1=?' and retrieve the qualified RIDs from INDEX1 (301). The query processor 113 also accesses INDEX2 to qualify the predicate 'C2=?' and retrieve the qualified RIDs from INDEX2 (301). Since the predicates are separated by OR, a row is considered qualified if it exists in either RID list from INDEX1 or INDEX2. Therefore, the RID lists are merged and duplicates removed (302). A count of the distinct RIDs would represent the count required by the query (303).

INDEX1 and INDEX2 are accessed separately, either serially or in parallel. Since the indexes store the same underlying table rows in their respective index key sequences, the same table row may be accessed in the index at distinctly different times. When motion picture semantics are used, where row updates are allowed during the query execution, a row read already from INDEX1 could have its C1 value updated after it is retrieved but before the same RID is compared in INDEX2. Absent going back to compare the table row with the final merged RID list, this change during the processing of the row will not be reflected in the final query result. However, the risk of this occurrence exists even without the embodiments of the present invention and may be considered acceptable.

Consider the query in Example 2, illustrated in FIG. 6. Referring also to FIG. 2, assume that same two indexes exist: INDEX1 on column C1; and INDEX2 on column C2. The query thus requires multiple indexes (201). Here, we further assume that no single index exists that contains both columns C1 and C2. Since the query in Example 2 only requires a COUNT(*) of the number of rows qualifying from both predicate 'C1=?' and 'C2=?', no columns are needed for the query result (202). The query optimizer 113 can resolve the query result using the qualified RIDs from INDEX 1 and INDEX2 without accessing the data pages (203). Now referring also to FIG. 3, in resolving the query result, the query processor 113 accesses INDEX1 to qualify the predicate 'C1=?' and retrieve the qualified RIDs from INDEX1 (301). The query processor 113 also accesses INDEX2 to qualify the predicate 'C2=?' and retrieve the qualified RIDs from INDEX2 (301). Since the predicates are separated by AND, a row is considered qualified if it exists in both RID lists from INDEX1 and INDEX2. Therefore, the RID lists are merged where a RID only survives if it exists in both RID lists (302). A count of the distinct RIDs would represent the count required by the query (303).

Consider the query in Example 3, illustrated in FIG. 6. Referring also to FIG. 2, assume the same two indexes exist: INDEX1 on column C1; and INDEX2 on column C2. The query thus requires multiple indexes (201). Since the query in Example 2 has a SELECT list that contains a non-column value (the literal value 1, in this example), no columns are needed for the query result (202). The query optimizer 113 can resolve the query result using the qualified RIDs from INDEX1 and INDEX2 without accessing the data pages (203). Now referring also to FIG. 3, in solving the query result, the query processor 113 accesses INDEX1 to qualify the predicate 'C1=?' and retrieve the qualified RIDs from INDEX1 (301). The query processor 113 also accesses INDEX2 to qualify the predicate 'C2=?' and retrieve the qualified RIDs from INDEX2 (301). Since the predicates are separated by OR, a row is considered qualified if it exists in either RID list from INDEX1 or INDEX2. Therefore, the RID lists are merged and duplicates removed (302). Step 303 would be repeated, such step 303 represents fetching the result "n" times from step 302, where n represents the number of distinct RIDs in the merged list. Such a query may check the existence of the result, without requiring a result to be returned (303). In this type of example, the application may only fetch 1 row to check existence.

Figure 4:
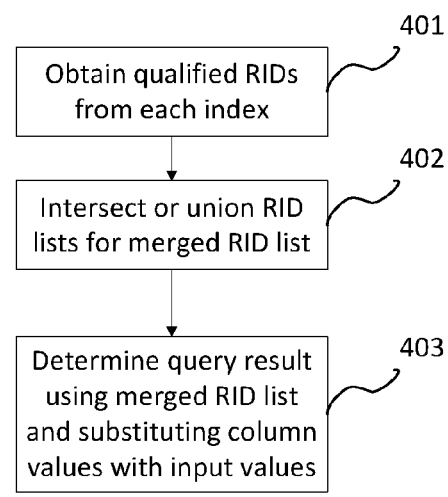
FIG. 4 illustrates a method for resolving a query result using qualified RIDs from indexes and input values of query without accessing data page(s) according to embodiments of the present invention

Returning to FIG. 2, when the query processor 113 determines that one or more columns from the indexes or the data page(s) are needed for the query, subquery, or inner join result (202), the query optimizer 113 determines whether the column values may be resolved using the query input values (204). If so, then the result is resolved using the qualified RIDs from the indexes and the input values of the query without accessing the data page(s) (206). As illustrated in FIG. 4, in resolving a query, the query optimizer 113 obtains the qualified RIDs from each index (401). The list of RIDs from each index is either intersected or unioned to create a merged RID list (402). The query result is then determined using the merged RID list and substituting the column values with the input values (403).

Consider the query in Example 4, illustrated in FIG. 6. Referring also to FIG. 2, assume that two indexes exist: INDEX1 on column C1; and INDEX2 on column C2. The query thus requires multiple indexes (201). The query optimizer 113 determines that the query requests columns from the result (202). However, the WHERE clause in this example query has equal predicates (HV1 and HV2) for both columns being selected. Thus, the query optimizer 113 determines that the column values may be resolved using the input values of the query (204). Now referring also to FIG. 4, in resolving the query result, the query optimizer 113 accesses INDEX1 to qualify the predicate 'C1=:HV1' and retrieve the qualified RIDs from INDEX1 (401). The query processor 113 also accesses INDEX2 to qualify the predicate 'C2=:HV2' and retrieve the qualified RIDs from INDEX2 (401). Since the predicates are separated by AND, a row only qualifies if both predicates are true. After the RID lists are intersected (402), the query optimizer 113 substitutes the column values with the input values 'HV1' and 'HV2' (403).

Returning to FIG. 2, when the column values may be resolved using the input values of the query (204), resolution using the qualified RIDs and the input values however would not be applicable when the columns are stored as variable lengths columns (205). This is because when processing the RID lists, the actual column value length is not part of the RID processing and is not known until query execution time. In this case, a conditional data page access is included as part of the access path and is considered during query execution (207). With a conditional data page access, the data row would only be accessed to retrieve the true column value and length if the column was longer than the input predicate. During query execution, the key for the data row is read (208), and the query optimizer 113 determines whether the key contains trailing blank(s) (209). If so, then the result is resolved with access to the data page(s) (210). If not, then the result is resolved using the qualified RIDs from the indexes and the input values of the query (206), as described above.

Consider again the query in Example 4, illustrated in FIG. 6. Assume that C1 is defined as a variable length column (205). During query execution, the key for C1 is read (208). Assume that ':HV1' is 'ABC', and C1 is 'ABC'. The column length of 3 thus matches the input value length of 3, and the C1 does not contain any trailing blanks (209). The result is then resolved using the qualified RIDs from the indexes and the input values of the query (206), as described above. However, if C1 is stored as 'ABC' (with one trailing blank), then the predicate would still qualify since trailing blanks are ignored for equal predicates. However, it would be incorrect to return the ':HV1' value of 'ABC' (with length 3). In this case, the conditional data access is triggered, and the result is resolved by obtaining the column value of C1 from the data page (210).

Examples 5 and 6, illustrated in FIG. 6, illustrate embodiments of the present invention as applied to subqueries. Referring to FIGS. 2-3 and Example 5, assume that two indexes exist: INDEX1 on column C1; and INDEX2 on column C2. Example 5 includes a correlated EXISTS subquery containing columns C1 and C2, thus the subquery requires multiple indexes (201). For an EXISTS clause, a value of TRUE or FALSE is returned, thus, no columns are needed for the subquery (202). Now referring also to FIG. 3, in resolving the query results, the query optimizer 113 accesses INDEX1 and INDEX2 to qualify the predicates and retrieve the qualified RIDs from INDEX1 and INDEX2 (301), and the RID lists are merged (302). In this example, once a row qualifies from either OR predicate, then the EXISTS subquery is considered TRUE for that outer row of table T1. In this manner, the result is resolved using the qualified RIDs from INDEX1 or INDEX2 without accessing the data page(s) (303). The query in Example 6 is similarly resolved as Example 5, except the predicates in the EXISTS subquery are separated by AND, thus both conditions must be met. In Example 6, the qualified RIDs for INDEX1 and INDEX2 are obtained (301) and merged (302). The first RID found that occurs in both RID lists is enough to determine that the EXISTS subquery is considered TRUE for that outer row in table T1 (303).

Examples 7 and 8, illustrated in FIG. 6, illustrate embodiments of the application of the present invention as applied to joins. For both Examples 7 and 8, assume that two indexes exist: INDEX1 on column C1; and INDEX2 on column C2, and each query requires multiple indexes (201). Example 7 includes a join of tables T1 and T2, and assume here a join sequence of T1 joined to T2. Columns are only requested for the result set from T1, thus, columns are not needed for the inner join result from table T2 (202). The result set from table T2 (the inner join table) may be resolved according to embodiments of the present invention, and this result set is used to resolve whether the outer table row qualifies. In Example 7, columns from T1 are requested, thus the resolution of the outer join may be performed with access to the data page. Now referring also to FIG. 3, for each outer row from T1, INDEX1 on T2 is accessed to retrieve the qualified RIDs for the join predicate on C1 and sorted into RID sequence, and INDEX2 is accessed to retrieve the qualified RIDs and sorted in RID sequence (301). The RID lists are merged and duplicates removed (302). The count of distinct RIDs from the RID merge list can then be used to determine how many times the outer T1 row must be returned (303). A query similar to Example 7 but with the join conditions separated by AND may be similarly resolved, and the count of the returned T1 rows is based upon the number of qualified RIDs surviving the intersection of the two ordered RID lists from INDEX1 and INDEX2.

Example 8 includes a join of tables T1 and T2 where the SELECT list does not require any columns returned from T2. The result set from table T2 (the inner join table) may be resolved according to embodiments of the present invention, and this result set is used to resolve the outer join. INDEX1 and INDEX2 are accessed to retrieve the qualified RIDs (301). The merged RIDs are then returned as the result of the inner join (303) and can then be used to determine which distinct rows of T1 is to be returned. Since the join to T2 is only looking for the existence of a row that satisfied either join condition, there is no need to accumulate and union the RID lists. A query similar to Example 8 but with the join conditions separated by AND may be similarly resolved, and existence of a RID in both RID lists is enough to qualify the T1 row.

Figure 5:
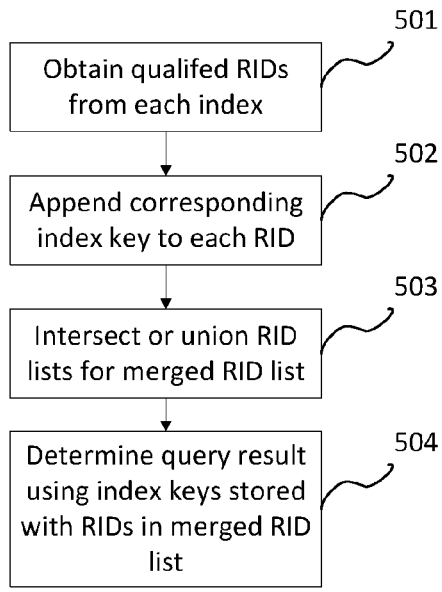
FIG. 5 illustrates a method for storing keys with qualified RIDs from indexes and resolving a query result using the keys without accessing the data page(s) according to embodiments of the present invention.

Returning to FIG. 2, when the query optimizer 113 determines that one or more columns are needed for the query, subquery, or inner join result (202), and the column values cannot be resolved using the input values of the query (204), then the query optimizer 113 stores the index keys with their corresponding RIDs during RID processing (211). The index keys stored with the qualified RIDs are then used to resolve the query result without accessing the data page(s) (212). As illustrated in FIG. 5, in resolving a query result, the query optimizer 113 obtains the qualified RIDs from each index (501) and appends the corresponding index key to each qualified RID (502). The RID lists are either intersected or unioned to create the merged RID list (503). The query optimizer 113 determines the query result using the index keys stored with the RIDs in the merged RID list without accessing the data page(s) (504). Optionally, the storage of the index keys may be optimized using any available technique without departing from the spirit and scope of the present invention. Such available techniques are known in the art and are not described here.

Consider the query in Example 9, illustrated in FIG. 6. Referring also to FIG. 2, assume that two indexes exist: INDEX1 on column C1; and INDEX2 on column C2. The query thus requires multiple indexes (201). The query requires both columns C1 and C2 to be returned in the SELECT list (202). The query includes range predicates, thus input values of the query cannot be substituted in the result (204). Now referring also to FIG. 5, the qualified RIDs from INDEX1 and INDEX2 are obtained (501). The C1 values/index keys are appended to the INDEX1 RIDs, and the C2 values/index keys are appended to the INDEX2 RIDs (502). The RID lists are sorted and merged according to the RIDs to create the merged RID list (503). The query result is then determined using the C1 values and the C2 values appended to the RIDs (504). By using the C1 and C2 values appended to the RIDs, the result is resolved without accessing the underlying tables T1 and T2.

Consider the query in Example 10, illustrated in FIG. 6. Referring also to FIG. 2, assume that two indexes exist: INDEX3 on columns C1, C2; and INDEX4 on columns C2, C1. The query requires both columns C1 and C2 to be returned in the SELECT list (202), and there are no input values from which the result can be resolved (204). Now referring also to FIG. 5, the qualified RIDs from INDEX3 and INDEX4 are obtained (501). The C1 and C2 values are appended to the RIDs from INDEX 3 for the predicate 'C1=?' (502). The C1 and C2 values are appended to the RIDs from INDEX4 for the predicate 'C2=?' (502). The RID lists are intersected to create the merged RID list (503). The query result is then determined using the RIDs, and the C1 and C2 values returned are resolved from the appended keys (504) without accessing the data pages.

Although Examples 9 and 10 illustrate single table queries, embodiments of the present invention may also be applied to queries containing multi-table subqueries and inner joins.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for index-only multi-index access in a relational database management system, comprising:
    determining that a query to be executed against a database requires multiple indexes;
    in determining that the query to be executed against the database requires the multiple indexes, determining whether one or more columns is needed for a query result, a subquery, or an inner join result;
    in determining that the one or more columns is needed for the query result, determining whether the one or more columns can be resolved using one or more input values of the query, the one or more input values comprising one or more equal predicates for the one or more columns; and
    in determining that the one or more columns can be resolved using the one or more input values of the query, resolving the query result using the one or more qualified record identifiers (RIDs) from the multiple indexes and substituting column values with the one or more equal predicates of the query without accessing the data pages of the database, wherein the resolving of the query result comprises:
        obtaining a list of qualified RIDs from each of the multiple indexes;
        intersecting or union the list of the qualified RIDs from each of the multiple indexes to create a merged RID list; and
        determining the query result using the merged RID list and substituting the column values with the one or more equal predicates of the query.

2. The method of claim 1, further comprising:
    in determining that the one or more columns cannot be resolved using the one or more input values of the query:
        storing one or more index keys corresponding to the one or more qualified RIDs from the multiple indexes with the one or more qualified RIDs; and
        resolving the query result using the one or more index keys stored with the one or more qualified RIDs without accessing the data pages of the database.

3. The method of claim 2, wherein the resolving of the query result using the one or more index keys stored with the one or more qualified RIDs without accessing the data pages of the database, comprises:
    obtaining a list of qualified RIDs from each of the multiple indexes;
    appending the one or more index keys corresponding to the qualified RIDs to the lists of qualified RIDs;
    intersecting or union the list of the qualified RIDs from the multiple indexes to create a merged RID list; and
    determining the query result using the one or more index keys stored with the qualified RIDs in the merged RID list.

4. A method for index-only multi-index access in a relational database management system, comprising:
    determining that a query to be executed against a database requires multiple indexes;
    in determining that the query to be executed against the database requires the multiple indexes, determining whether one or more columns is needed for a query result, a subquery, or an inner join result; and
    in determining that the one or more columns is not needed for the query result, resolving the query result using one or more qualified record identifiers (RIDs) from the multiple indexes without accessing data pages of the database, comprising:
        determining whether the one or more columns is a variable length column; and
        in determining that the one or more columns is not the variable length column, resolving the query result using the one or more qualified RIDs from the multiple indexes and the input values of the query without accessing the data pages of the database; and
        in determining that the one or more columns is the variable length column, including a conditional data page access during a query execution.

5. The method of claim 4, wherein the query execution comprises:
    reading a key for a data row;
    determining whether the key contains one or more trailing blanks;

in determining that the key contains the one or more trailing blanks, resolving the query result by accessing the data pages of the database; and in determining that the key does not contain any trailing blanks, resolving the query result using the one or more qualified RIDs from the multiple indexes and the input values of the query without accessing the data pages of the database.

\* \* \* \* \*